US006549088B1

(12) United States Patent
Tatomir et al.

(10) Patent No.: US 6,549,088 B1
(45) Date of Patent: Apr. 15, 2003

(54) FREQUENCY ADJUSTABLE MULTIPOLE RESONANT WAVEGUIDE LOAD STRUCTURE

(75) Inventors: Paul Tatomir, Fallbrook, CA (US); Christopher L. Trammell, La Habra, CA (US); Rolf Kich, Redondo Beach, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/960,816

(22) Filed: Sep. 21, 2001

(51) Int. Cl.[7] .............................. H04B 3/14; H01P 1/24

(52) U.S. Cl. ................... 333/28 R; 333/22 R; 333/248; 333/18; 375/232; 375/233; 375/236

(58) Field of Search ................................ 333/24.1, 136, 333/161, 246, 1.1, 21 A, 99 R; 375/232, 236, 233, 229

(56) References Cited

U.S. PATENT DOCUMENTS 3,714,608 A * 1/1973 Barnes et al. ................ 333/1.1
3,935,550 A * 1/1976 Adam et al. .............. 333/28 R
4,504,836 A * 3/1985 Seavey ...................... 333/21 A
4,638,267 A * 1/1987 Holpp ........................ 333/1.1
4,704,589 A * 11/1987 Moeller ....................... 333/113
4,735,764 A * 4/1988 Sugawara .............. 315/111.71
4,918,409 A * 4/1990 Lamberty ................... 333/1.1
5,130,678 A * 7/1992 Edwards .................... 333/28 R
5,892,412 A * 4/1999 Norte et al. .............. 333/28 R
6,396,037 B1 * 5/2002 Rossouw et al. ......... 333/21 A

* cited by examiner

*Primary Examiner*—Michael Tokar
*Assistant Examiner*—Lam T. Mai
(74) *Attorney, Agent, or Firm*—DiPinto & Shimokaji, PC

(57) ABSTRACT

A resonant waveguide load structure is provided for use in waveguide systems. The load structure includes a length of waveguide which is open at one end and closed at the other end. The load structure also includes a support pin mounted inside the waveguide near the closed end thereof. The load structure further includes a resonant body mounted on the support pin. The load structure also includes at least one spacer member mounted on the support pin for maintaining the position of the resonant body. This load structure may be combined with a waveguide circulator to provide a novel waveguide equalizer apparatus.

23 Claims, 3 Drawing Sheets

FREQUENCY ADJUSTABLE MULTIPOLE RESONANT WAVEGUIDE LOAD STRUCTURE

BACKGROUND OF THE INVENTION

This invention relates to electromagnetic waveguides and particularly to waveguide load structures.

In waveguide signal transmission systems there is sometimes a need to provide amplitude equalization for different components of the signal. Existing forms of waveguide equalizers are somewhat inflexible and not entirely satisfactory in providing the desired performance. One known form of waveguide equalizer involves a stepped waveguide load having the steps dimensioned to cause signal attenuation at a selected frequency. This form of load is not tunable once it is constructed. Also, the slope of the match is not adjustable and additional inflection points cannot be added. Thus, the correction of multiple ripples in the system response cannot be done with a single stepped waveguide load.

As indicated by the foregoing, there is a need for a waveguide load structure that provides a multipole frequency response for compensating for multiple ripples in the system response pattern. It would also be desirable to have a waveguide load structure which is tunable to adjust the shape and slope of its response curve to match a desired frequency profile.

SUMMARY OF THE INVENTION

In accordance with one feature of the invention, there is provided a new and improved resonant waveguide load structure for use in waveguide signal transmission systems. Such load structure includes a length of waveguide that is open at one end and closed at the other end. Such load structure further includes a resonant body suspended in the waveguide near the closed end thereof.

In accordance with another feature of the invention, there is provided a resonant waveguide load structure which includes a length of waveguide which is open at one end and closed at the other end. A support pin is mounted inside the waveguide near the closed end thereof. A resonant body is mounted on the support pin. At least one spacer member is mounted on the support pin for maintaining the position of the resonant body on the support pin.

In accordance with a further feature of the invention, there is provided a new and improved waveguide equalizer apparatus. Such apparatus includes a waveguide circulator having at least three ports, one of which is an input port and another of which is an output port. The apparatus also includes a waveguide load structure having one end coupled to a third port of the circulator located intermediate the input and output ports. This waveguide load structure is closed at the end opposite the circulator-coupled end. The apparatus further includes a resonant body suspended inside the waveguide load structure near the closed end thereof.

For a better understanding of the present invention, together with other and further advantages and features thereof, reference is made to the following description taken in connection with the accompanying drawings, the scope of the invention being pointed out in the appended claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
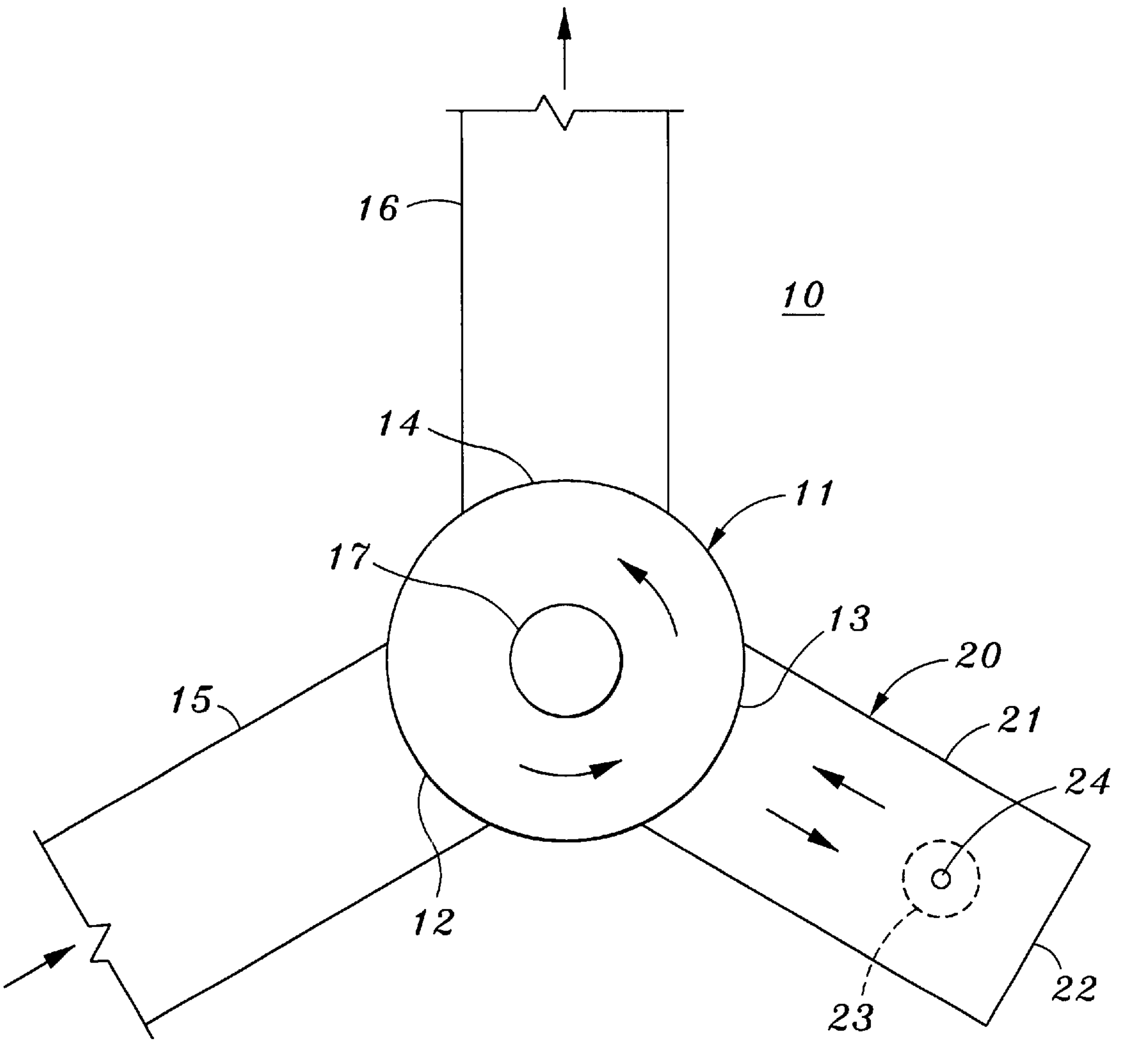
FIG. 1 is a plan view of a representative embodiment of waveguide equalizer apparatus constructed in accordance with the present invention.

Referring to FIG. 1 of the drawings, there is shown a plan view of a representative embodiment of waveguide equalizer apparatus 10 constructed in accordance with the present invention. Apparatus 10 can include a waveguide circulator 11 that may have three ports 12, 13 and 14. Port 12 can be an input port having an input waveguide 15 coupled thereto. Port 14 can be an output port having an output waveguide 16 coupled thereto. Port 13 can be a third port located intermediate the input port 12 and the output port 14. A magnet assembly 17 can be located inside circulator 11 in the center of circulator 11 for directing the electromagnetic energy moving through circulator 11 from port to port.

A resonant waveguide load structure 20 can be coupled to the third port 13 of circulator 11. Load structure 20 may include a short length of waveguide 21 having one end coupled to the third port 13 of circulator 11. The other end of waveguide 21 can be completely closed by a metal end wall 22. A resonant body 23 may be suspended inside waveguide 21 near the closed end 22 of waveguide 21. The upper end of a support pin 24 for resonant body 23 is visible in FIG. 1.

In operation, an incoming radio-frequency electromagnetic wave signal can be delivered by input waveguide 15 to the circulator 11. Circulator 11 can then divert this signal into load structure waveguide 21. The signal travels the length of waveguide 21 and may be reflected back from the end wall 22. When the reflected signal reaches circulator port 13, it can be diverted by circulator 11 into the output waveguide 16 from wince it is delivered to its intended destination. During its passage down and back in load structure waveguide 21, the signal can be affected by and modified by the electromagnetic characteristics of the resonant body 23. More particularly, resonant body 23 may absorb some frequency components of the signal more than other frequency components and, in this manner, can be used to alter the amplitude profile of the signal.

Figure 2:
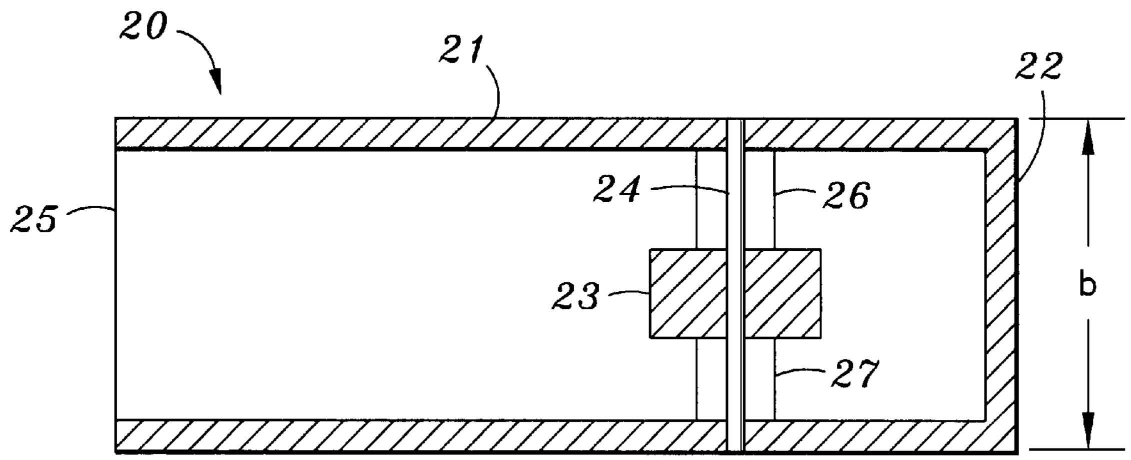
FIG. 2 is a cross-sectional elevational view of a representative embodiment of a resonant waveguide load structure constructed in accordance with the present invention.
Figure 3:
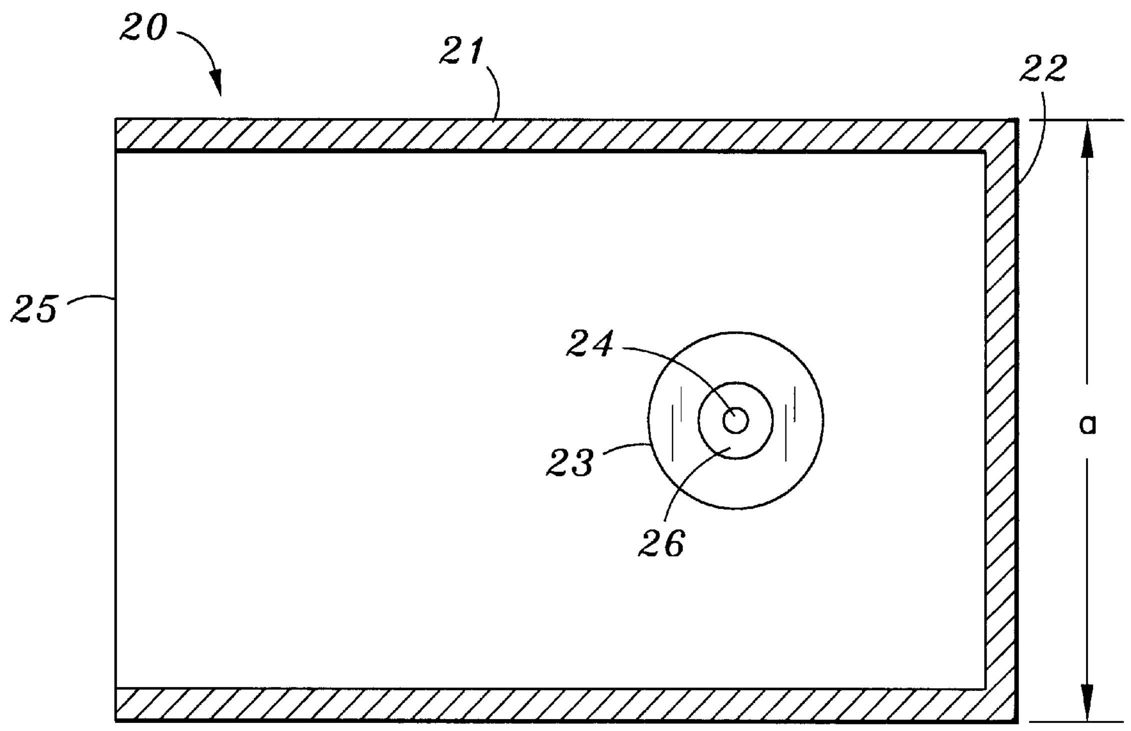
FIG. 3 is a cross-sectional plan view of the resonant waveguide load structure of FIG. 2.

Referring to FIGS. 2 and 3, there is shown in greater detail the construction of the resonant waveguide load structure 20. Such load structure 20 can include a length of rectangular waveguide 21 that is open at one end 25 and is completely closed at the other end by solid conductive metal end wall 22. End wall 22 may extend at right angles to the longitudinal center axis of waveguide 21. For the case of a type WR-42 waveguide, for example, dimension “a” is 0.42 inches and dimension “b” is 0.17 inches. A metal support pin 24 may be mounted inside waveguide 21 near the closed end 22. Support pin 24 can extend across the interior of waveguide 21 across the shorter dimension thereof. The extremities of support pin 24 can be attached to opposing upper and lower side walls of waveguide 21. A puck-shaped resonant body 23 can be mounted on support pin 24 at a central location on support pin 24. Resonant body 23 may have a cylindrical passageway through its center for receiving the support pin 24. The load structure 20 can further include a pair of non-conductive, non-magnetic cylindrical spacer members 26 and 27 mounted on support pin 24 for maintaining resonant body 23 at a central location on support pin 24. Spacer member 26 may be located above resonant body 23 and spacer member 27 may be located below resonant body 23. Each of spacer members 26 and 27 can have a cylindrical passageway through the center thereof for receiving the support pin 24.

The resonant body 23 can have a toroidal shape, a permeability greater than one, and a permittivity greater than one. A suitable material for the resonant body 23 is ferrite. In other words, the puck-shaped resonant body 23 may be predominately made of ferrite material. A suitable material for spacer members 26 and 27 is TEFLON (trademark of DuPont Company).

Figure 4:
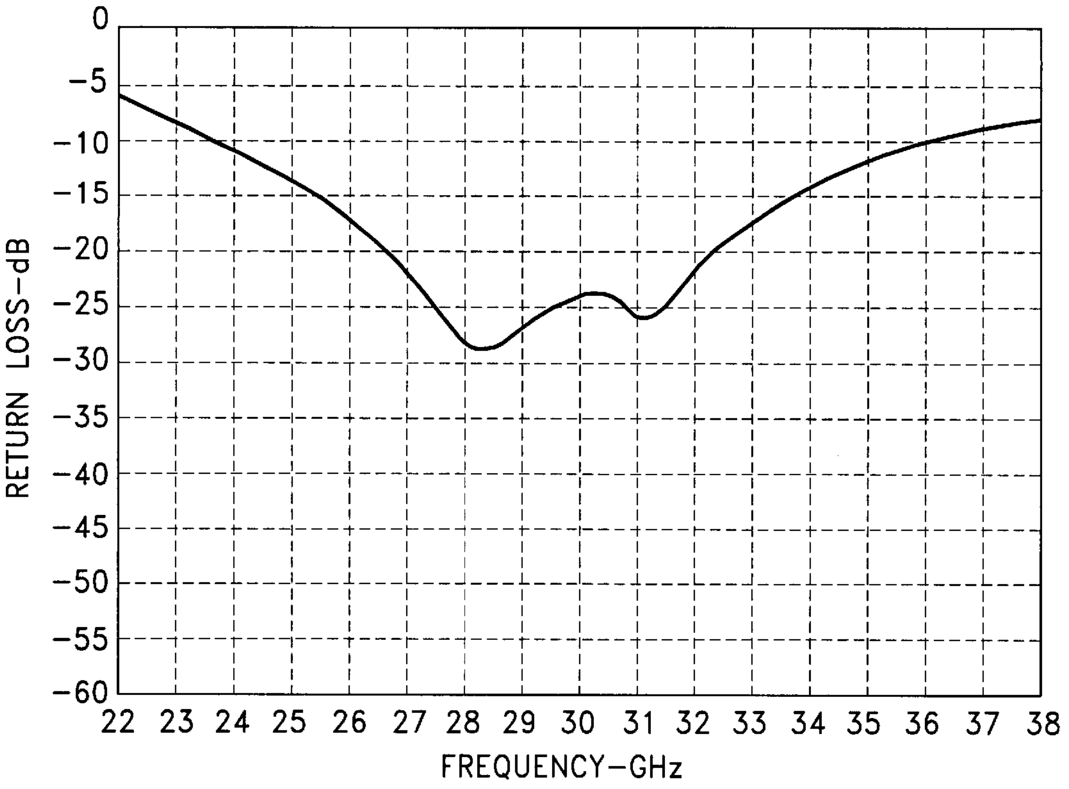
FIG. 4 is a graph used in explaining the operation of the resonant waveguide load structure of FIGS. 2 and 3.

Referring now to FIG. 4, there is shown a graph of return loss versus frequency obtained for a representative embodiment of resonant waveguide load structure 20. The return loss axis is scaled in decibels and the frequency axis is scaled in gigahertz. Two poles (resonance points) are clearly visible, one between 28 and 29 gigahertz and the other slightly above 31 gigahertz. The locations, sizes and shapes of these poles can be adjusted by varying the diameter, thickness and permeability of the resonant body 23, the diameter of the metal support pin 24, the diameters and dielectric constants of spacers 26 and 27, and the distance between the support pin 24 and the end wall 22.

By using a waveguide load structure of the type represented by load structure 20 on a waveguide circulator, there is provided an amplitude equalizer having a great degree of flexibility. Such an equalizer can correct for multiple ripples and asymmetric ripples in the amplitude response characteristics of the system. Equalizers in accordance with the present invention will provide greater efficiency, leading to smaller and lighter equalizer units.

It Will be obvious to those skilled in the art that various changes and modifications may be made herein without departing from the invention and it is, therefore, intended to cover all such changes and modifications as come within the true spirit and scope of the invention.

We claim:

1. A resonant waveguide load structure comprising:

a length of waveguide which is open at one end and closed at another end; and a resonant body suspended on a support pin in the waveguide near the closed end thereof, wherein the resonant body is composed predominantly of a ferrite material.

2. A resonant waveguide load structure in accordance with claim 1 wherein the resonant body is mounted in a central location inside the waveguide.

3. A resonant waveguide load structure in accordance with claim 1 wherein the resonant body is of a toroidal shape.

4. A resonant waveguide load structure in accordance with claim 1 wherein the resonant body has a permeability greater than one.

5. A resonant waveguide load structure in accordance with claim 1 wherein the resonant body has a permittivity greater than one.

6. A resonant waveguide load structure comprising:

a length of waveguide which is open at one end and closed at another end; and a resonant body suspended in the waveguide near the closed end thereof, wherein the resonant body is composed predominantly of a ferrite material.

7. A resonant waveguide load structure comprising:

a length of waveguide which is open at one end and closed at another end; and a resonant body suspended in the waveguide near the closed end thereof, wherein the resonant body is a puck-shaped body of ferrite material.

8. A resonant waveguide load structure comprising:

a length of waveguide which is open at one end and closed at another end;

a support pin mounted inside the waveguide near the closed end thereof, where the support pin extends across the interior of the waveguide;

a resonant body mounted on the support pin, wherein the resonant body is composed predominantly of a ferrite material; and at least one spacer member mounted on the support pin for maintaining the position of the resonant body.

9. A resonant waveguide load structure in accordance with claim 8 wherein the support pin comprises a metal support pin.

10. A resonant waveguide load structure in accordance with claim 8 wherein the support pin is attached to opposing walls of the waveguide.

11. A resonant waveguide load structure in accordance with claim 10 wherein the resonant body is centrally mounted on the support pin.

12. A resonant waveguide load structure comprising:

a length of waveguide which is open at one end and closed at another end;

a support pin mounted inside the waveguide near the closed end thereof;

a resonant body mounted on the support pin, wherein the resonant body is spaced apart from the inner walls of the waveguide; and at least one spacer member mounted on the support pin for maintaining the position of the resonant body.

13. A resonant waveguide load structure comprising:

a length of waveguide which is open at one end and closed at another end;

a support pin mounted inside the waveguide near the closed end thereof;

a resonant body mounted on the support pin, wherein the resonant body is composed predominantly of ferrite material; and at least one spacer member mounted on the support pin for maintaining the position of the resonant body.

14. A resonant waveguide load structure comprising:

a length of waveguide which is open at one end and closed at another end;

a support pin mounted inside the waveguide near the closed end thereof;

a resonant body mounted on the support pin, wherein the resonant body is a puck-shaped body of ferrite material; and at least one spacer member mounted on the support pin for maintaining the position of the resonant body.

15. A resonant waveguide load structure comprising:

a length of waveguide which is open at one end and closed at another end;

a support pin mounted inside the waveguide near the closed end thereof;

a resonant body mounted on the support pin; and at least one spacer member mounted on the support pin for maintaining the position of the resonant body, wherein the spacer member is composed of non-conductive, non-magnetic material.

16. A resonant waveguide load structure comprising:

a length of waveguide which is open at one end and closed at another end;

a support pin mounted inside the waveguide near the closed end thereof;

a resonant body mounted on the support pin; and a pair of spacer members are mounted on the support pin with one located above and the other located below the resonant body for maintaining the resonant body at a central location on the support pin.

17. A resonant waveguide load structure comprising:

a length of rectangular waveguide which is open at one end and closed at another end by a conductive wall extending at right angles to a center axis of the waveguide;

a metal support pin mounted inside the waveguide near the closed end thereof, such support pin extending across an interior of the waveguide across a shorter dimension thereof with its extremities attached to opposing side walls of the waveguide;

a resonant body mounted on the support pin at a central location on the support pin, such resonant body being a puck-shaped body of ferrite material having a passageway through the center thereof for receiving the support pin; and a pair of non-conductive, non-magnetic spacer members mounted on the support pin with one located above and the other located below the resonant body for maintaining the resonant body at a central location on the support pin.

18. A waveguide equalizer apparatus comprising:

a waveguide circulator having at least three ports, one of which is an input port and another of which is an output port;

a waveguide load structure having one end coupled to a third port of the circulator located intermediate the input and output ports, such waveguide load structure being closed at an end opposite the circulator coupled end; and a resonant body suspended on a support pin inside the waveguide load structure near the closed end thereof wherein the resonant body is composed predominantly of a ferrite material.

19. A waveguide equalizer apparatus in accordance with claim 18 wherein the waveguide load structure comprises a short length of waveguide having one end coupled to the third port of the circulator, with another end being closed.

20. A waveguide equalizer apparatus in accordance with claim 19 wherein the resonant body is centrally mounted inside the short length of waveguide near the closed end thereof.

21. A waveguide equalizer apparatus comprising:

a waveguide circulator having at least three ports, one of which is an input port and another of which is an output port;

a waveguide load structure having one end coupled to a third port of the circulator located intermediate the input and output ports, such waveguide load structure being closed at an end opposite the circulator coupled end, wherein the waveguide load structure comprises a short length of waveguide having one end coupled to the third port of the circulator, with another end being closed; and a resonant body suspended inside the waveguide load structure near the closed end thereof, wherein the resonant body is centrally mounted inside the short length of waveguide near the closed end thereof, and wherein the resonant body is dimensioned to provide a resonant point at a predetermined frequency for an input signal.

22. A waveguide equalizer apparatus comprising:

a waveguide circulator having at least three ports, one of which is an input port and another of which is an output port;

a waveguide load structure having one end coupled to a third port of the circulator located intermediate the input and output ports, such waveguide load structure being closed at an end opposite the circulator coupled end, wherein the waveguide load structure comprises a short length of waveguide having one end coupled to the third port of the circulator, with another end being closed; and a resonant body suspended inside the waveguide load structure near the closed end thereof, wherein the resonant body is centrally mounted inside the short length of waveguide near the closed end thereof and wherein the resonant body is dimensioned to provide a desired amplitude equalization for an input signal.

23. A waveguide equalizer apparatus comprising:

a waveguide circulator having at least three ports, one of which is an input port and another of which is an output port;

a waveguide load structure having one end coupled to a third port of the circulator located intermediate the input and output ports, such waveguide load structure being closed at an end opposite the circulator coupled end, wherein the waveguide load structure comprises a short length of waveguide having one end coupled to the third port of the circulator, with another end being closed; and a resonant body suspended inside the waveguide load structure near the closed end thereof, wherein the resonant body is centrally mounted inside the short length of waveguide near the closed end thereof and wherein the resonant body is a puck-shaped body of ferrite material.

* * * * *